United States Patent [19]

Perlman

[11] Patent Number: 5,420,862
[45] Date of Patent: May 30, 1995

[54] ROUTER USING REMOTE ADDRESS RESOLUTION TO ENABLE BRIDGE LIKE DATA FORWARDING

[75] Inventor: Radia J. Perlman, Acton, Mass.

[73] Assignee: Digital Equipment Corporation, Maynard, Mass.

[21] Appl. No.: 716,041

[22] Filed: Jun. 14, 1991

[51] Int. Cl.$^6$ .................................... H04L 12/46
[52] U.S. Cl. .................... 370/85.13; 370/94.1
[58] Field of Search ........... 370/85.13, 85.14, 85.6, 370/94.1, 60, 60.1, 94.2, 92; 340/825.02

[56] References Cited

U.S. PATENT DOCUMENTS

| Re. 33,426 | 11/1990 | Sugimoto et al. | 370/85.1 |
|---|---|---|---|
| 4,287,592 | 9/1981 | Paulish et al. | 370/85.14 |
| 4,621,362 | 11/1986 | Sy | 370/85.14 |
| 4,621,362 | 11/1986 | Sy | 370/88 |
| 4,707,827 | 11/1987 | Bione et al. | 370/85 |
| 4,737,953 | 4/1988 | Koch et al. | 370/94.1 |
| 4,797,881 | 1/1989 | Ben-Artzi | 370/88 |
| 4,809,265 | 2/1989 | Hart et al. | 370/85 |
| 4,811,337 | 3/1989 | Hart | 370/85 |
| 4,872,162 | 10/1989 | Tanaka et al. | 370/85 |
| 4,890,281 | 12/1989 | Balboni et al. | 370/60 |
| 4,933,937 | 6/1990 | Konishi | 370/85.1 |
| 4,933,938 | 1/1990 | Sheehy | 370/85.1 |
| 4,941,089 | 7/1990 | Fisher | 364/200 |
| 4,947,390 | 8/1990 | Sheehy | 370/85.1 |
| 5,018,137 | 5/1991 | Backes et al. | 370/85.1 |
| 5,079,765 | 1/1992 | Nakamura | 370/85.13 |
| 5,086,426 | 2/1992 | Tsukakoshi et al. | 370/85.14 |
| 5,111,453 | 5/1992 | Morrow | 370/94.1 |

FOREIGN PATENT DOCUMENTS

| 0255767 | 7/1987 | European Pat. Off. |
| 0357136 | 8/1989 | European Pat. Off. |
| 0465201 | 1/1991 | European Pat. Off. |

OTHER PUBLICATIONS

IEEE Network: The Magazine of Computer Communications, vol. 2, No. 1 Jan. 1988, New York US, pp. 49–56. L. Bosack et al. "Bridges and Routers, Observations Comparisons and Choosing".

European Search Report, EP 92 30 5234, Sep. 22, 1992. Pending Patent Applications: Ser. #07/577,437, filed Sep. 4, 1990, Attorney Docket PD90-0094.

(List continued on next page.)

Primary Examiner—Douglas W. Olms
Assistant Examiner—Chau T. Nguyen
Attorney, Agent, or Firm—A. Sidney Johnston; David A. Dagg

[57] ABSTRACT

A communications system is disclosed, having a first communications link, a second communications link, a first end station attached to said first communications link, a first packet forwarding apparatus attached to the first communications link, a second end station attached to the second communications link, and a second packet forwarding apparatus attached to the second communications link. Each packet forwarding apparatus routes packets it receives having destination address equal to a data link destination address of the apparatus, and bridges all other received packets. When the first end station wishes to send a packet to the second end station, it first transmits an ARP request message to learn the data link address of the second end station. The first apparatus receives the ARP (Address Resolution Protocol) request message, and determines that the end station for which a data link address is requested is attached to a remote communications link. The first apparatus requests the second apparatus to transmit an ARP request message to determine the second station's address, and to relay the ARP response back to the first apparatus. When the first apparatus receives the ARP response, it forwards the response to the first end station. The first end station transmits subsequent packets to the second end station, using the data link address of the second end station as a data link destination address. These subsequent packets can be bridged by any intermediary apparatus between the first end station and the second end station.

22 Claims, 6 Drawing Sheets

OTHER PUBLICATIONS

"Internetworking with TCP/IP, vol.: 1 Principles, Protocols, and Architecture", by Douglas E. Comer, Second Edition, Copyright 1991, Prentice Hall, Englewood Cliffs, N.J., pp. 73–88, 478–479.

"Interconnections: Bridges and Routers", by Radia Perlman, Copyright 1992, published by Addison—Wesley Publishing Co., Reading Mass., pp. 194–203, 367.

"LAN/WAN Internetworking Performance Issues", by G. B. Elam, Y. J. Liu and K. A. Ralmer, Copyright 1988, AT&T Bell Laboratories, Holmdel, N.J., published by IEEE.

"LAN Interconnection: A Transparent, Shortest-Path Approach", by Tsung-Yuan Tai and Mario Gerla, Copyright 1991, Computer Science Department, University of California, Los Angeles, published by IEEE.

"Handbook of Computer-Communications Standards, vol. 3, Second Edition, The TCP/IP Protocol Suite", by William Stallings et al., Copyright 1990, published by Howard Sams & Company, a divison of Macmillan, Inc., Carmel, Ind., pp. 62–64.

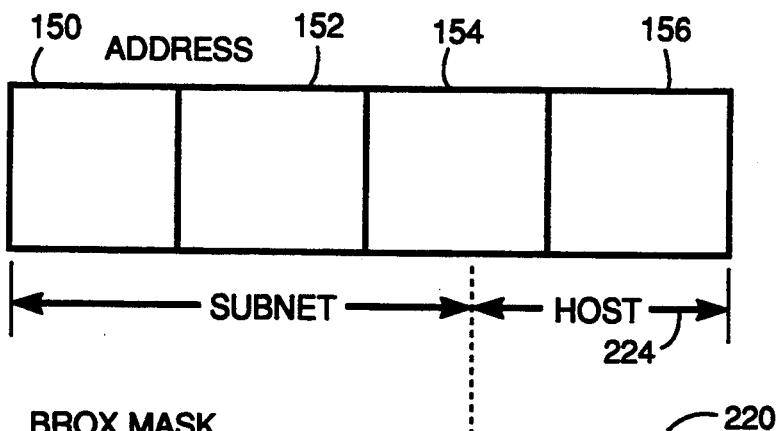
FIGURE 6A
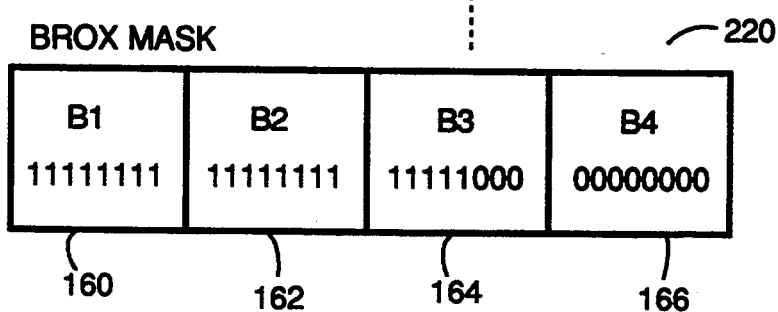
FIGURE 6B
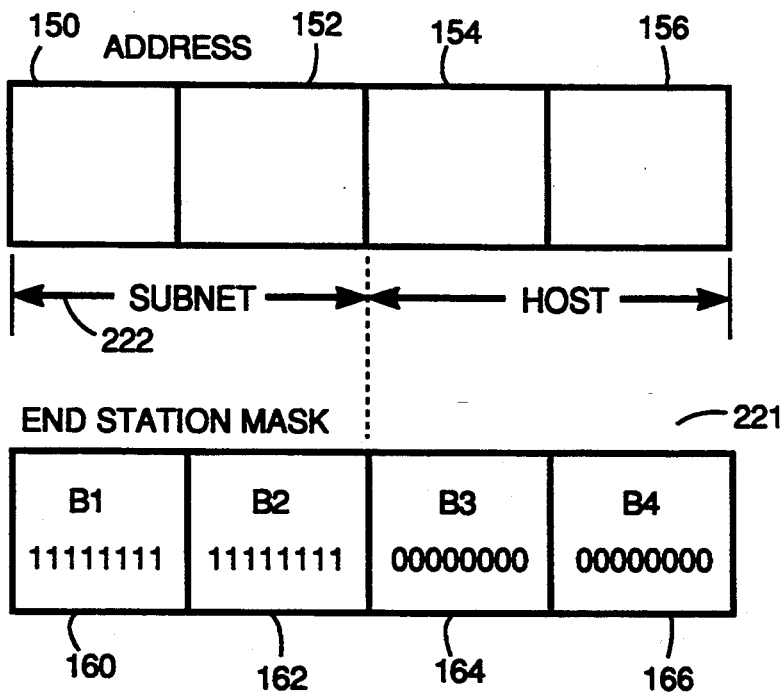
FIGURE 7A
FIGURE 7B

ROUTER USING REMOTE ADDRESS RESOLUTION TO ENABLE BRIDGE LIKE DATA FORWARDING

FIELD OF THE INVENTION

This invention relates to forwarding messages from a first link to another link, and more particularly relates to reducing the time required to forward data packets.

BACKGROUND OF THE INVENTION

Communications systems between computers are presently capable of connecting tens of thousands of computers. Typically, a computer will originate a message directed to another computer, and will transmit the message as a sequence of data packets onto the communications system. Because of the large number of computers connected to the system, and the large number of data packets transferred between the computers, throughput of packets transferred by the system is an important issue.

Communications systems are often divided into a number of links. Typically, a link may be a local area network, where each local area network is capable of supporting a few hundred computers. A local area network will hereinafter be referred to as a LAN. The LANs are connected together by a number of different standard devices which forward packets. With the increasingly large size of modern communications systems, the time required to forward a data packet between LANs becomes an important parameter of system design.

Other types of links in a communications system may be, for example, a wide area network formed by joining other links such as LANs, a point to point connection between computers, etc. Maintaining high throughput of system packet traffic is also an important problem in all link to link connections. Also, all types of links may be connected together by standard devices.

Before discussing standard devices used to connect links together, data packets and the headers of data packets added by different layers of the communications protocol must be discussed. A data packet is typically formed in a higher level of the communications protocol, and finally is transferred down to the Transport Layer which passes the packet into the Network layer. The Network layer attaches a header, the Network Layer Header, to the data packet, and then passes the packet into the Data Link Layer. The Data Link Layer then attaches a header, the Data Link Layer Header, to the data packet. The packet is then transmitted onto the communications system by the physical layer. A packet, once transmitted onto the communications system, is then forwarded from link to link until it reaches its destination end station.

A first type of device connecting links of the communications system is a bridge. A bridge operates in the Data Link level of the communications protocol, which is the level immediately above the physical level. A bridge receives data packets from one link, typically a LAN, and then parses the Data Link Header. The bridge then makes a decision on what to do with the data packet, where the decision is based upon the contents found in the Data Link Header.

A second type of device linking LANs is a router. A router operates in the network layer, a layer above the data link layer. A router operates by parsing both the Data Link Header and the Network Layer Header, and making decisions based on the contents of both headers.

In some designs a bridge may be on the order of 200 times faster than a router in forwarding a data packet from a first link to a second link.

Even though a router is slower in forwarding packets from one link, such as a LAN, to another link, it is necessary to use routers rather than bridges at certain locations between multiple numbers of links. The router performs functions beyond those of a bridge, such as: forwarding along better routes than a bridge; incrementing a "hop count" field of a forwarded packet to show the number of passes of the packet through a router in order to prevent indefinite looping of the packet; preventing certain management traffic such as "hello" messages from end stations on one link from being forwarded to the other link; maintaining "network layer addresses" of stations on the links that it connects; fragmentation and reassembly of packets because of different protocols employed by different links; performing explicit handshaking protocols with end stations connected to links connected to the router; participating in routing algorithms, and other functions.

However, a difficulty in operation of large computer communications networks is that the time required for a router to forward messages may result in lower throughput.

SUMMARY OF THE INVENTION

The invention is an apparatus for forwarding packets, and solves the difficulty of a router requiring too much time for forwarding a packet, along with the difficulty of a bridge increasing ARP traffic by forwarding ARP messages.

A communications system has a first communications link and a second communications link, at least one end station capable of communicating on each of the communications links, an apparatus for forwarding a packet from the first link to the second link, the apparatus capable of detecting a network layer header on a data packet, the network layer header having a destination address. There is assigned, to the apparatus, an apparatus mask having a forwarding mask length for distinguishing the destination address into a subnet address part and into a host address part. Also there is assigned, to an end station, an end station mask having an end station mask length for distinguishing the destination address into a subnet address part and into a host address part. And there is assigned a greater length to the forwarding mask length than to the end station mask length, to enable the end station in using the end station mask to identify all end stations on the first link and the second link as being on a single link, and to enable the apparatus in using the forwarding mask to distinguish which of the first link or the second link an end station addressed by the network layer address is located.

Also there is a first means for a selected end station to transmit a local Address Request Protocol (hereinafter ARP) request message onto the first communications link, the local ARP request message requesting a data link address of a receiving end station. Further, there is a second means, in response to the local ARP request message, for the apparatus to create a remote ARP request message and to send the remote ARP request message to a second forwarding apparatus connected to the second link having the receiving end station connected thereto. There is also a third means for the apparatus to receive a remote ARP response message containing the data link address of the receiving end station from the second forwarding apparatus. And there is a fourth means, responsive to the remote ARP request message, for the apparatus to create a local ARP response message and to send the local ARP response message to the selected end station.

The forwarding apparatus forwards a data packet as a bridge in the event that a data link address in a message packet is not a data link address of the apparatus.

The forwarding apparatus forwards a data packet as a router in the event that a data link address in the message packet is a data link address of the apparatus.

BRIEF DESCRIPTION OF THE DRAWINGS

FIG. 6A is a field diagram of an address in accordance with the invention.

FIG. 6B is a field diagram of a brox mask in accordance with the invention.

FIG. 7A is a field diagram of an address in accordance with the invention.

FIG. 7B is a field diagram of an end station mask in accordance with the invention.

DETAILED DESCRIPTION

FIRST EXEMPLARY EMBODIMENT

Capitalization will be used in this document to highlight names of fields of a packet, in order to improve readability of the document.

Figure 1:
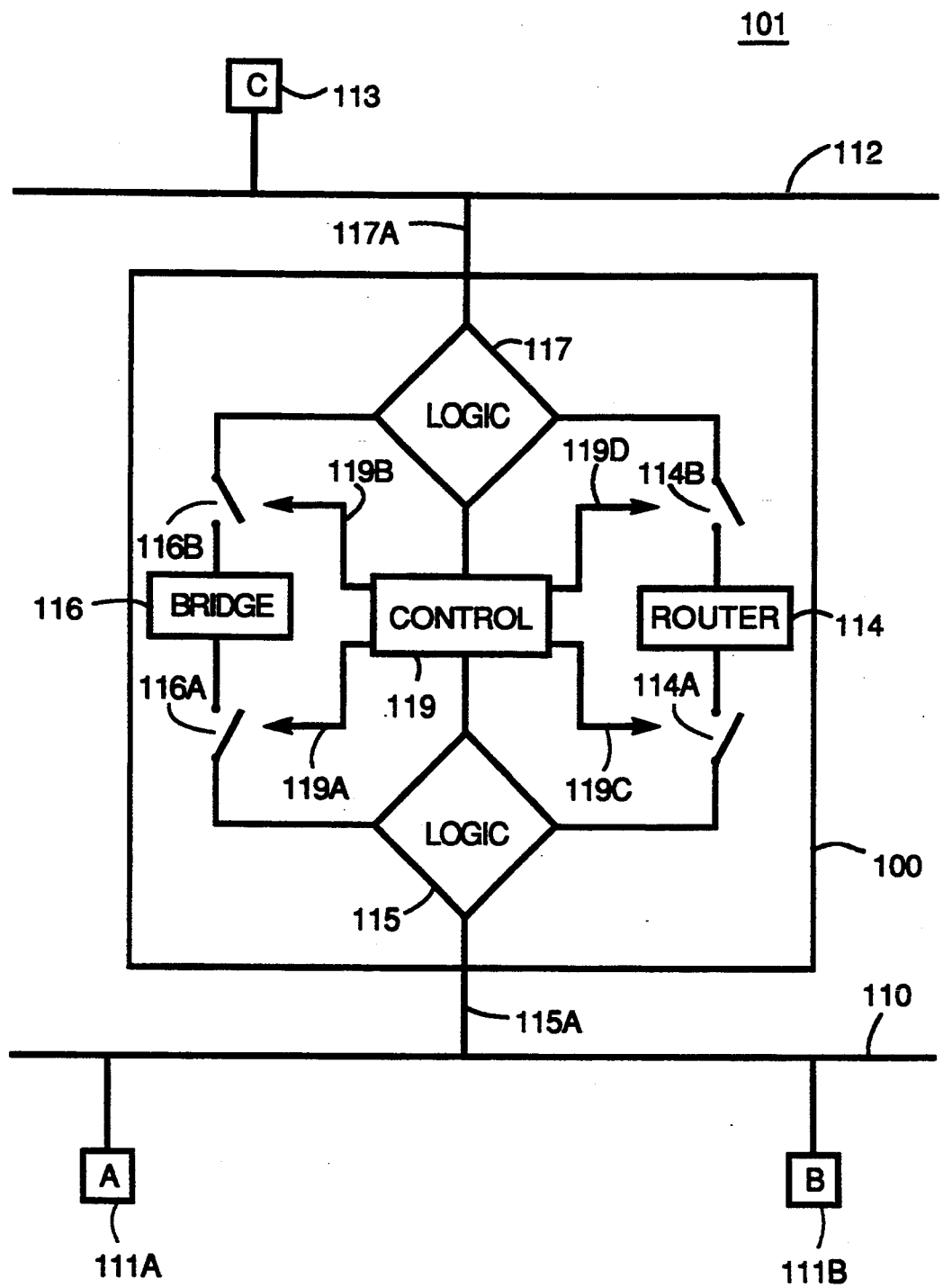
FIG. 1 is a logic diagram of two LANs connected by the invention.

Referring now to FIG. 1, there is shown a communications link connection apparatus 100, a "brox" in accordance with the invention. The term "brox" is coined herein, and is defined as a box for connecting communications links in accordance with the present invention. A brox forwards as a router under certain conditions, but under other conditions forwards as a bridge. The word "brox" is an acronym (created from the capitalized letters Bridge Router bOX) for a box that behaves as a bridge or as a router. Also a brox may have behavior modes that are neither those of a standard bridge nor those of a standard router.

For a multiple hop data packet transmission, operation of the invention can be described in simple terms for a network using a TCP-IP type protocol as follows. TCP-IP is a well known protocol suite which has been developed in the United States. The present invention works particularly well with the TCP-IP protocol, but will also work with similar protocols.

But first, a TCP-IP type of protocol will be briefly described. In a TCP-IP type protocol, a destination address in the Network Layer Header of a packet is resolved into a subnet address and a host address by applying a mask to the total address. A mask is assigned to a link. A station is configured with a network layer address and a mask for each link to which the station is attached. The mask has as many bit positions as the address in the packet.

The mask has some bits set equal to "1", and some bits set equal to "0". The bits of the mask that equal "1" correspond to bits of the address that identify the link. The bits of the mask that equal "0" correspond to bits of the address that identify the host, or end station, on that link.

For example: in the event that the network layer address is 32 bits (or 4 octets), then the mask is also 32 bits; in the further event that the mask has 16 bits set =1, and 16 bits set =0, then the station interprets the bits in the address corresponding to the bits =1of the mask as identifying the link. The bits in the address corresponding to "0s" in the mask identify the host, or end station, on that link.

As further example, if the first two octets of the mask contain 8 bits =1each, and the second two octets of the mask contain all bits =0, then the address of the link is contained in the two octets of the address corresponding to the bits =1of the mask. Also, the host, or station, address on that link is contained in the address bits corresponding to the bits =0 of the mask.

Terminology used in the art of computer communications will now be addressed. The terms "link" and "subnet" are substantially synonyms. Also, the terms "host" and "end station" are substantially synonyms. The terms "link" and "end station" are frequently used in discussions of OSI standard type computer communications systems. The terms "subnet" and "host" are frequently used in discussions of TCP-IP type computer communications systems. A link or a subnet may be a local area network, or may be another type of system for computer communications. A host or end station is the computer attached to the link or the subnet.

A further standard feature of a TCP-IP type protocol is that when an initiating station initiates a transmission to an intended receiving station, the initiating station "knows" only the Network Layer address of the intended receiving station. In order to "learn" the Data Link Layer address of the intended receiving station, the initiating station transmits an Address Request Protocol (ARP) message. A bridge forwards the ARP message, but a router ignores the ARP message. In the event that the intended receiving station receives the ARP message, either by being on the same link as the station or by having the ARP request bridged to the link containing the intended receiving station, then the intended receiving station sends to the initiating station an ARP response containing the Data Link Layer address of the intended receiving station. Upon receipt of the ARP response, the initiating station sends data packets to the intended receiving station by placing the Data Link Layer address learned from the ARP response into the Data Link Header of the data packets.

Also, as a standard practice in a TCP-IP type protocol, an initiating station first tests the Network Layer address of the intended receiving station against its own Network Layer address. Each station on the communications link of the initiating station has the same subnet address, and so the initiating station, tests the subnet address of the intended receiving station against the its own subnet address.

In the event that the two subnet addresses are equal, the initiating station transmits an ARP message.

In the event that the two subnet addresses are different, then the initiating station transmits a data packet to a router ,connected to the communications link of the initiating station. The router maintains a forwarding table, and so "knows" the communications link containing the intended receiving station. The router then forwards the data packet to the proper link, where a further router places the Data Link Layer address of the intended receiving station into the Data Link Layer Header of the data packet, and forwards the data packet onto the proper link for receipt by the intended receiving station. The originating station does not learn the data link address of the receiving station.

Turning now to a simple discussion of the invention, both the router and the bridge are replaced with the "brox" of the invention. Also, in the invention, the network layer addresses of the end stations on the various links are carefully chosen so that all end stations on all links connected by the invention have in their network layer address: firstly, a sequence of bits that are identical for all end stations attached to any of the links connected by broxs; secondly, a sequence of bits that are identical for stations on a single link, but different for stations on other links; and, thirdly, a sequence of bits that are unique among stations on any one link.

The forwarding apparatus of the invention is the brox. A brox has assigned a mask that exposes both the sequence of identical bits and the sequence of unique bits. In contrast, the end stations have a shorter mask that exposes only the sequence of identical bits.

All end stations linked by the invention have the same sequence of identical bits. Accordingly, when an initiating station tests the network layer address of the intended receiving station against its own network layer address in order to determine if the initiating station has permission to send a local ARP message, then permission to send a local ARP message will be granted for an intended end station linked by the invention, whether the intended end station is on the same link as the initiating station or whether it is on a different link.

Also in the invention it is important to distinguish four (4) different types of ARP messages. These four different types of ARP messages are:

1. a local ARP request. A local ARP request is transmitted by an end station onto a link connected to the end station. A local ARP request asks for a data link address of an intended destination station. A local ARP request is identical to the standard TCP-IP compatible ARP request discussed hereinabove.
2. a local ARP response. A local ARP response is received by an end station, and the local ARP response delivers a data link address to the end station. A local ARP response is identical to the standard TCP-IP ARP response discussed hereinabove.
3. a remote ARP request. A remote ARP request is created by a brox on the link of an originating end station, and is created by the brox in response to receipt by the brox of a local ARP request. The remote ARP request is transmitted to a remote brox on the link of a remote intended destination station.
4. a remote ARP response. A remote ARP response is created by a remote brox on the link of a remote intended destination station, and is created in response to the remote brox receiving a local ARP response. The remote ARP response is transmitted to a brox on the link of the originating end station, and in response to receiving the remote ARP request, the brox creates and transmits a local ARP response to the originating end station.

By carefully choosing the addresses of all end stations linked by the invention, by using broxs for forwarding between the various links, and by using short masks for stations and long masks for broxs, useful results flow from the invention. The first useful result is that data packets are forwarded at bridge speed between end stations linked by the invention. A second useful result is that local ARP traffic on one link is confined to that link and is not forwarded as it would be if the links were joined by a conventional bridge. A third useful result is that all links joined by the invention may be reached by remote ARP messages generated in response to any end station on any of the links, without flooding every link with unnecessary local ARP messages.

Forwarding rules followed by a brox may be summarized as follows:

1. in the event that the brox recognizes the address found by parsing the Data Link Destination Address field of a packet as an address used by that brox, then the brox receives the packet and functions as a router.
2. in the event that the brox does not recognize the destination address found by parsing the Data Link header as an address of the brox, then the brox bridges the packet.
3. in the event that the brox recognizes the packet as a local ARP request, and the intended destination end station is on a remote link as determined by the brox using its long mask, then the brox creates a remote ARP request and sends it to a brox on the link of the intended destination end station.
4. later the brox receives a remote ARP response from a brox attached to the link of the intended destination end station. The brox then creates a local ARP response in response to the original local ARP request. The local ARP response contains the data link layer address of the intended receiving end station. The brox then transmits the local ARP response onto the link having the originating end station. The local ARP response is received by the originating end station, and so the originating end station learns the data link address of the intended destination station.

A significant benefit of the invention is that, once the originating end station learns the data link address of the intended destination end station, forwarding of later sent data packets is at bridge speed, rather than router speed. The forwarding delay at each brox, in some designs, may be as much as 200 times less when the brox functions as a bridge rather than as a router. Accordingly, the invention greatly speeds forwarding of data packets.

Figure 2:
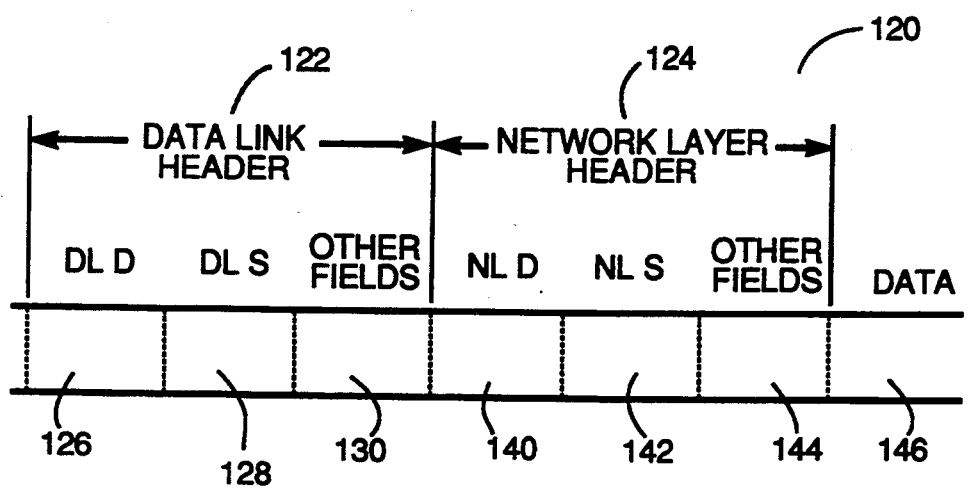
FIG. 2 is a field diagram of a data packet in accordance with the invention.

Referring now to FIG. 2, there is shown a typical field structure for a data packet used by an end station of LAN 110, 112 shown in FIG. 1. Data packet 120 is shown having a Data Link Header 122 and a Network Layer Header 124. When data packet 120 is created and transmitted onto a LAN, the network layer attaches Network Header 124 to the packet, and then the packet is handed down to the data link layer. The data link layer then attaches the Data Link Header 122 to the packet. Upon transmission, data packet 120 may have additional fields preceding the Data Link Header 122 such as, for example, preamble fields, and the precise structure of such preamble fields will depend upon the standard to which LAN 110 is designed. Such preamble fields are not shown in FIG. 2, as FIG. 2 focuses on those fields used by the invention.

Data Link Header 122 contains Data Link Destination Address field 126, and Data Link Source Address field 128. Other Data Link Header fields 130 are also shown in FIG. 2, but are not further described herein in that the invention focuses on the Data Link Destination Address field 126 and the Data Link Source Address field 128 of the Data Link Header 122. Data Link Destination Address field 126 is abbreviated DL D. Data Link Source Address field 128 is abbreviated DL S.

Network Layer Header 124, as shown in FIG. 2, has: Network Layer Destination address field 140, NL D field 140; Network Layer Source address field 142 NL S; and other fields 144. Also, data fields 146 follows the Network Layer Header 124. The Network Layer Destination Address field 140 is abbreviated NL D. The Network Layer Source address field 142 is abbreviated NL S.

In exemplary network designs, the Network Layer Destination address field 140 and the Network Source Layer field 142 may each be assigned a fixed length. The length is often expressed in terms of octets. An octet is a data structure that is ordinarily 8 bits long. For example, in a TCP-IP compatible network both the Network Layer Destination Address field 140 and the Network Layer Source Address field 142 are assigned a length of 32 bits, or 4 octets each.

Figure 1A:
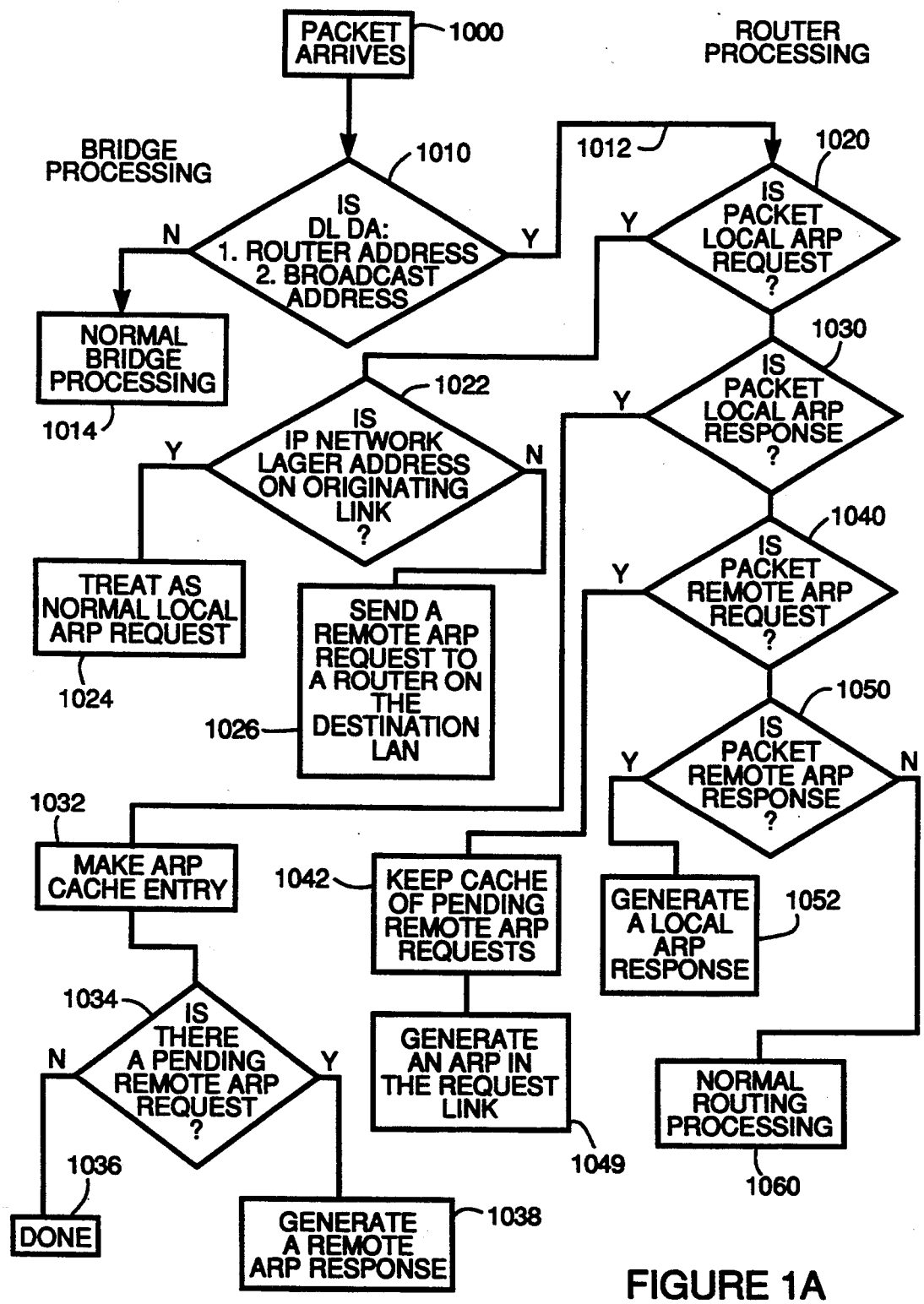
FIG. 1A is a flow chart of a brox in accordance with the invention.

Turning now to FIG. 1A, there is shown a flow chart of the logic of an exemplary brox 100. At block 1000 the packet arrives at the brox. Control passes to decision block 1010 where the packet data link destination address contained in the Data Link Destination Address field 126 of the packet is determined. Then, the packet data link destination address is tested in order to determine if it is either a router address or a broadcast address used by a router. In the event that decision block 1010 answers "yes", the packet data link destination address is either a router address or a broadcast address, then control passes to line 1012 for router type processing.

In the event that decision block 1010 answers "no", then control passes to block 1014 where the packet is further processed by normal bridge forwarding.

Router processing proceeds along line 1012 to a series of decision blocks, block 1020, block 1030, block 1040, and block 1050. At these decision blocks the type of packet is determined.

At block 1020 the packet is tested in order to determine if it is a local ARP request, and in the event that it is, decision block 1020 answers "yes" and control passes to decision block 1022 for handling as a local ARP request. In the event that decision block 1020 answers "no" then control passes to decision block 1030.

At decision block 1030 the packet is tested in order to determine if it is a local ARP response, and if it is decision block 1030 answers "yes", then control passes to block 1032 for further processing as a local ARP response. In the event that decision block 1030 answers "no" then control passes to decision block 1040.

At decision block 1040 the packet is tested in order to determine if it is a remote ARP request, and if it is decision block 1040 answers "yes", then control passes to block 1042 for processing as a remote ARP request.

In the event that decision block 1040 answers "no", then control passes to decision block 1050.

At decision block 1050 the packet is tested in order to determine if it is a remote ARP response, and if it is decision block 1050 answers "yes", then control passes to block 1052 for further processing as a remote ARP response. In the event that decision block 1050 answers "no", then control passes to block 1060.

At block 1060 the packet is forwarded to the proper link in accordance with normal routing processing.

We return to discuss the processing in the event that the packet tested with a "yes" at decision blocks 1020, 1030, 1040, and 1050.

First we discuss processing in the event that decision block 1020 answers "yes" the packet is a local ARP request, and control passes to decision block 1022. A branch to decision block 1022 means that a host on a link connected to the brox issued a local ARP request. At decision block 1022 the packet is tested in order to determine if the network layer address of the intended destination host is on the originating link, and if it is decision block 1022 answers "yes", then processing branches to block 1024. At block 1024 the packet is treated as a normal local ARP request. In the event that decision block 1022 answers "no", the packet network layer destination address is not on the originating link, then control passes to block 1026. At block 1026 the brox sends a remote ARP request to a brox or router on the destination LAN.

Next we discuss processing in the event that the packet is a remote ARP request as determined by a "yes" response at decision block 1040, where control passed to block 1042. At block 1042 a cache entry is made to record that a pending remote ARP request has been received. Control then passes to block 1049 where a local ARP request is generated on the relevant link, where the link is connected to a port of the brox. Processing in blocks 1042 and 1049 means that the brox is the remote brox in a remote ARP request.

Next we discuss processing in the event that the packet is a local ARP response, that is that decision block 1030 answered "yes", and processing passed to block 1032. At block 1032 an entry is made into the cache of pending remote ARP requests, and control passes to decision block 1034. At decision block 1034 the question, "Is there a pending remote ARP request that matches this local ARP response ?" is asked, and in the event that the answer is "no", then control passes to block 1036 where processing of this packet stops because processing is done.

In the event that decision block 1034 answers "yes", there is a matching pending remote ARP request, then control passes to block 1038. At block 1038 the brox generates a remote ARP response message and sends the response to the originating brox.

Next we discuss processing in the event that decision block 1050 answered "yes", the packet is a remote ARP response, and control passes to block 1052. At block 1052 the brox generates a local ARP response and transmits it onto the relevant link connected to the brox. Processing at block 1052 means that the brox originally generated a remote ARP request, now the remote ARP response has arrived, and the remote ARP response is used to create a local ARP response directed to the originating host.

Normal operation of a bridge and normal operation of a router will now be described.

Bridges

The Data Link Header 122 contains a number of fields, and the fields principally used by the bridge are: the Data Link Destination Address field 126; and, the Data Link Source Address field 128 (FIG. 2).

The bridge compares the address found in the Data Link Destination Address field with a forwarding table maintained in a database contained in the bridge, and also compares the contents of the Data Link Source Address field of the packet with a list of source addresses maintained for each link connected to the bridge. The bridge then, typically makes forwarding decisions based upon the contents of these fields.

Typical design rules for operation of a bridge are as follows, and include both rules for receipt of a packet and rules for forwarding a packet.

For receipt of a packet, a bridge tests the contents of the Data Link Destination Address field of the packet against internally maintained forwarding tables.

For forwarding, the bridge decides what to do with the packet, for example, as follows. Typically, for a bridge that uses the flooding and backward learning algorithm, the bridge makes the following decisions, based upon the contents of the Data Link Destination Address field of the packet: if the packet Data Link Destination Address is in the forwarding table of a link attached to the bridge, then forward the packet to the proper link, except, if the packet destination is on the link from which the packet originated, then disregard the packet; and, if the destination address is not in the forwarding table, then flood the packet to all of the links connected to the bridge, but not the link from which the packet originated. Also, typically, a bridge forwards packets having certain multicast or broadcast addresses in their Data Link Destination Address field, such as end station hello messages. A bridge attempts to make the links that it joins together operate as an extended LAN.

Also, If the content of the Data Link Source Address field of the packet is absent from the bridge forwarding tables, then the bridge adds to its appropriate forwarding table a correlation between the address contained in the Data Link Source Address field of the packet and the link from which the packet arrived. Any subsequent packets addressed to that address are then forwarded onto the correlated link. By updating its forwarding table using the arrival link of unknown packets, a bridge learns the correlation between arrival links and the source address of end stations either on those links or connected to those links from other links, and thereby builds up entries into its forwarding tables. Further, for example, there are many other ways that entries in a bridge forwarding table may be compiled.

Routers

A router receives a packet in the event that the Data Link Destination Address field DL D 126 of the packet contains the data link address of the router or a special multicast address used by routers, otherwise the router ignores the packet.

In the event that a router receives a packet, the router uses its mask to analyze the network layer destination address carried in the Network Layer Destination Address field NL D 140 of the packet. By using its mask, the router breaks the packet network layer destination address into a subnet, or link, part and into a host address part.

The router "knows" a route to the destination link as a result of a forwarding table maintained by the router. The forwarding table is built up by the router participating in router protocol algorithms. The router forwards the packet by placing an appropriate data link destination address in the Data Link Destination Address field DL D of the packet, and by transmitting the packet onto the proper link.

Routers perform other functions not directly related to the present invention, such as: running routing protocols in order to decide on routes to maintain between links when there are choices of multiple routes, that is, participating in routing algorithms; isolating links, by, for example, preventing certain management traffic such as end station hello messages on one link from being forwarded to another link; fragmentation and reassembly of packets because of different protocols employed by different links; performing explicit handshaking protocols with end stations connected to links connected to the router; and other functions.

Figure 3A:
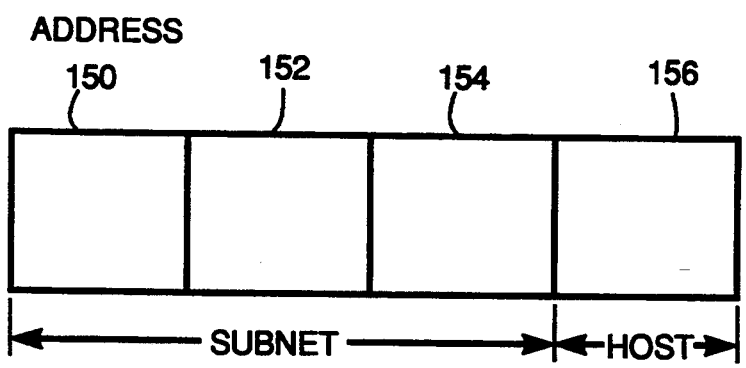
FIG. 3A is field diagram of an address field.

Referring now to FIG. 3A, there is shown the structure of a Network Layer Address. FIG. 3A may refer to the address of a station on a link. Alternatively, FIG. 3A may refer to a Network Layer Destination Address field of a message packet. As a further alternative, FIG. 3A may refer to a Network Layer Source Address field of a message packet. For convenience, the field structure of FIG. 3A may be referred to as the structure of a Network Layer Destination (often abbreviated as NL D) address field of a message packet, although, as will be apparent to those skilled in the art, the discussion could equally well apply to the Network Layer Source Address field (often abbreviated as NL S address field) 142 of a message packet. Also, FIG. 3A will be used to describe a Network Layer Address assigned to a station.

As shown in FIG. 3A, NL D address field 140 contains 4 bytes, byte 150, byte 152, byte 154, and byte 156. Each byte 150 152 154 156 is an octet, and thereby contains 8 bits.

Figure 3B:
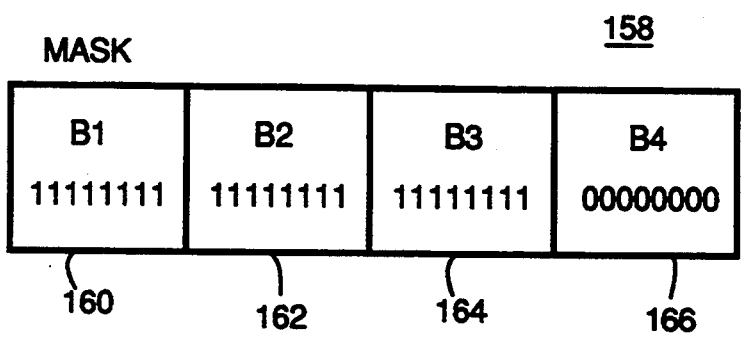
FIG. 3B is a field diagram of a mask for an address field.

Referring now to FIG. 3B, there is shown mask 158. Mask 158 has 4 bytes, byte 160, byte 162, byte 164, and byte 166. A mask is assigned to a station, for example the mask is assigned to end station A 111A, or, for example, B 111B, or, for example, end station C 113C, or to brox 100. In the event that a station detects a message packet, the station applies mask 158 to NL D address field 140 in order to determine the address represented by the NL D address field 140. For example, in the example shown in FIG. 3A and FIG. 3B, the mask 158 is shown having all ones in byte ].60, byte 162, and byte 164. In contrast, byte 166 contains all zeros. Accordingly, the corresponding bytes of NL D address field 140, that is byte 150 corresponding to byte 160 of the mask, byte 152 corresponding to byte 162 of the mask, and byte 154 corresponding to the mask byte 164 represent the subnet address. The term "subnet" is synonymous with "link" and may accordingly stand for a local area network LAN, or any other type of link. Byte 156 of NL D address field 140 corresponds to the zeros of mask byte 166, and accordingly represents the address of a "host". The term "host" is synonymous with "station" and so may stand for an "end station", a "brox", or any other type of station. Mask 158 indicates, by the zeros in byte 166, that the host address represented by NL D address field 140 is contained in byte 156.

Accordingly, mask 158 interprets NL D address field 140 so that bytes 150, 152 154 represent a subnet address. And also mask 158 indicates that byte 156 represents a host address.

As shown in FIG. 3B, mask 158 has byte 160 indicated as byte B1. Byte 162 is indicated as byte B2. Byte 164 is indicated byte as B3. Byte 166 is indicated as byte B4. The labels B1, B2, B3, and B4 indicate the position of the byte within mask 158.

SECOND EXEMPLARY EMBODIMENT

Operation of communications system 101, as shown in FIG. 1, will now be discussed. In the event that end station A 111A decides to send a message packet to end station C 113, then the following events occur:

1. End station A 111A first attempts to learn the data link layer address of end station C 113. In the first step to learn the data link layer address of end station C 113, end station A 111A tests its network layer address against the network layer address of end station C 113 in order to determine if the two end stations are on the same link. And if the two end stations are on the same link, then end station A 111A has permission to transmit an Address Request Protocol message (a local ARP request message). An local ARP request message transmitted by an end station will be hereinafter referred to as a local ARP request.

Figure 3C:
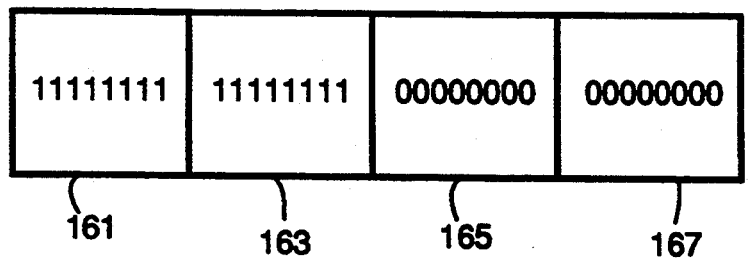
FIG. 3C is a field diagram of a mask for an address field.

End station A 111A uses a short mask, as shown in FIG. 3C, in making the determination as to whether or not end station C 113 is on the same link as end station A 111A, and because of the careful choice of end station network layer addresses, concludes that end station C 113 is on the same link as end station A 111A. As shown in FIG. 3C, the short mask used by end station A 111A has byte 161 and byte 163 both contain eight 1s, and byte 165 and byte 167 both contain eight zeros. Accordingly, end station A 111A "sees" only byte 150 and byte 152 of the address fields shown in FIG. 3A, as the subnet address of itself and of end station C 113. By careful choice of the end station addresses, both end station A 111A and end station C 113 have the same value of bytes 150 152 in their network layer addresses. Accordingly, end station A 111A concludes that it and end station C 113 are on the same link.

Physically, as is shown in FIG. 1, end station A 111A is on link 110 and end station C 113 is on link 112. However, because of the careful choice of end station network layer addresses, and by end station A 111A using a short mask, end station A 111A concludes that it and end station C 113 are on the same link.

2. In response to its conclusion that end station C 113 is on the same link, end station A 111A transmits a local ARP Request onto link 110.

3. The local ARP Request is detected by brox 100. Logic unit 115 detects that the packet is a local ARP request. In response to receiving the local ARP request, brox 100 creates a new local ARP request. Brox 100 sends the new local ARP request onto link 112 with the data link layer address of end station C 113 in the data link destination address field 126. By using the long mask of FIG. 3B, where byte 164 contains eight 1s, brox 100 can determine the link to which end station C 113 is connected. And by using the portion of the mask containing "0s" brox 100 can determine the network layer address of intended destination end station C 113.

4. End station C 113 receives the second local ARP Request message from LAN 112, and responds by creating a local ARP response message, and then transmitting the local ARP Response message onto link 112. The local ARP Response message contains the data link layer address of end station C 113.

5. Brox 100 detects the local ARP response message and processes it by logic 117. Brox 100 then determines that this local ARP response is in completion of a pending ARP request. Brox 100 then creates a second local ARP response message, and transmits the second local ARP response message onto link 110.

6. End station A 111A receives the second local ARP response message on LAN 110, and extracts from it the data link layer address of end station C 113.

7. End station A 111A transmits a message packet to end station C 113 by placing the data link layer address of end station C 113 into the Data Link Destination Address field 126 of the message packet.

8. Brox 100 detects the message packet addressed to end station C 113, concludes that the data link destination address field 126 of the packet does not contain a data link destination address of brox 100, and therefore forwards the message packet as a bridge, and the message packet is thereby forwarded onto link 112. This bridge type forwarding operation is fast, as brox 100 made the decision by parsing only the Data Link Header field 122 of the message packet.

9. End station C 113 then detects the message packet by recognizing its data link destination address in the data link destination address field 126 of the message packet, and receives the message packet.

10. End station A 111A then may transmit a sequence of message packets to end station C 113 by: inserting the data link address of end station C 113 into the data link destination address field 126 of the message packet; and then brox 100 forwards the message packets as a bridge.

Advantages of the invention may be seen as follows. Brox 100 blocked the local ARP request message transmitted by end station 111A from being forwarded onto link 112, and in that respect functioned as a router. Brox 100 forwards the message packets transmitted by end station A 111A onto link 112, where the message packet contains the data link layer address of end station C 113 in the data link destination address field 126. Brox 100 thus rapidly forwards message packets, and also isolates local ARP traffic onto a single link.

A benefit of the invention is that local ARP request and local ARP response messages on one link, for example link 110, are blocked from the other link, in this example link 112, by brox 100. A further benefit of the invention is that in the event that an end station on one link, say link 112, sends a sequence of data packets to an end station on the other link, then all packets after the first packet are forwarded at bridge speed.

THIRD EXEMPLARY EMBODIMENT

Figure 4:
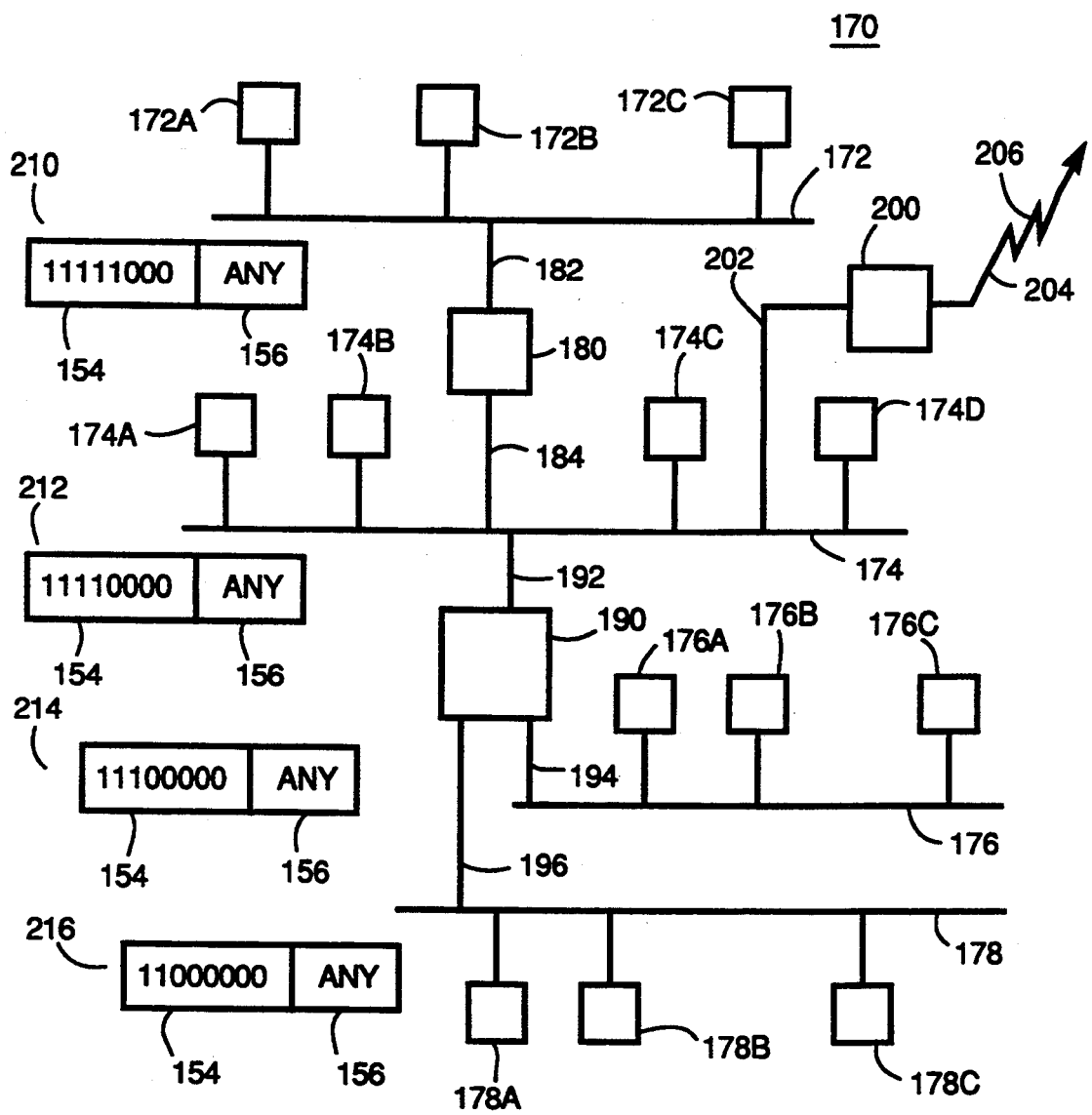
FIG. 4 is a block diagram of a communications system having multiple links, in accordance with the invention.

A multiple hop embodiment of the invention will now be discussed. Referring now to FIG. 4, there is shown a more complex communications system 170. Communications system 170 has link 172, link 174, link 176, and link 178. Link 172 has end stations 172A, 172B, and 172C. Additionally, link 172 may have a further plurality of end stations, and may, for example, support up to several hundred end stations.

Link 174 has end stations 174A, 174B, 174C, and 174D. Also, Link 174 may support a further plurality of end stations.

Link 176 has end station 176A, end station 176B, and end stations 176C. Further, Link 178 has end station 178A, end station 178B, and end station 178C. Also, Link 176 and 178 may each support a further plurality of end stations.

Although links 172 174 176 178 are shown in FIG. 4 as straight lines, each link may, for example, be a token ring communication system such as an IEEE 802.5 token ring or an ANSI/IEEE FDDI token ring.

Brox 180 has a connection 182 to link 172, and also has a connection 184 to link 174. Brox 190 has connection 192 to link 174, and also has a connection 194 to link 176. Additionally, brox 190 has a connection 196 to link 178. Brox 200 has a connection 202 to link 174, and a connection 204 to a wide area network through a communications link, as indicated by jagged arrows 206.

The addresses of stations on links 172 174 176 178 are given by the address field of FIG. 3A. Bytes 150 and byte 152 of the addresses are the same for all stations on all links 172 174 176 178. Bytes 154 and byte 156 are different for the various links and stations as described hereinbelow.

Referring to FIG. 4, address 210 shows fields 154 and 156 of the address fields of FIG. 3A as assigned to stations on link 172. Field 154 contains; 11111000. Byte 156 may contain any combination of ones and zeros. The value of byte 156 is assigned to give a unique value for each end station 172A, 172B, 172C, and so forth. Only one byte 156 is reserved for the host address for end stations connected to link 172, and so the number of stations that may be individually addressed are $2^{**}8$, or 256 stations.

Address 212 show bytes 154 and 156 of addresses of FIG. 3A as assigned to stations on link 174. Byte 154 contains: 11110000. Byte 156 contains any value, and a unique value of byte 156 is assigned to each station connected to link 174. For example, end stations 174A, 174B, 174C, 174D, and connection 184 to brox 180, and connection 192 to brox 190 are each assigned a unique value of byte 156. Again, byte 156 may refer to as many as 256 stations.

Address 214 shows bytes 154 and 156 of addresses of FIG. 3A as assigned to stations on link 176. Byte 154 of address 214 contains: 11100000. Byte 156 contains any value, and a unique value of byte 156 is assigned to each station on link 176. For example, end station 176A, 176B, 176C, and connection 194 to brox 190, each have assigned a unique value of byte 156.

Address 216 shows bytes 154 and 156 of addresses of FIG. 3A as assigned to stations on link 178. Byte 154 of address of 216 contains; 11000000. Byte 156 has assigned any value, and has a unique value assigned for each station connected to link 178, for example, end stations 178A, 178B, 178C, and connection 196 to brox 190.

Each end station in communications system 170 uses mask 221 as shown in FIG. 7B. Mask 221 has all 1s in byte B1 160, all 1s in byte in B2 162, all zeros in byte B3 164, and all zeros in byte B4 166. Accordingly, whenever any end station in system 170 applies mask 221 to an address of an intended receiving station lying within system 170, the intended receiving station will appear to the transmitting end station to lie on the same link as the transmitting end station. This result arises from the following application of mask 221 to the address of any end station on system 170:

AND ($A_{13}$ my, mask),

AND (A_receive, mask), where A_my is the network layer address of the end station, and where A_receive is the network layer address of the intended receiving end station.

The AND operations are followed by a test of the equality of the two AND operations.

In the event that the two AND operations are equal, then the transmitting end station concludes that it is on the same link as the intended receiving end station. Accordingly, in the event that the two AND operations are equal, the transmitting end station has permission to transmit a local ARP request message in order to inquire: "What is the data link address of the intended receiving end station?".

Referring now to FIG. 6A and FIG. 6B, there is shown an address in FIG. 6A. Part of the address of FIG. 6A is a subnet address, and part of the address is a host address, as determined by the appropriate mask. There is shown a mask for a brox in FIG. 6B. The mask of FIG. 6B is assigned to broxs 180 190 200. Byte B1 160, and byte B2 162, both contain 8 1s, as shown in FIG. 6B. Byte B3 164 contains: 11111000. Byte B4 166 contains all zeros. When mask 220, FIG. 6B, is applied to the address 210 of link 172, or to address 212 of link 174, or to address 214 of link 176, or to address 216 of link 178, then the arrangement of 1s in byte 164 of mask 220 allows the various links to be distinguished. That is, the longest address in byte 154 is in address 210 of link 172, and consists of five (5) 1s. These five 1s are masked for incorporation in the subnet address by the arrangement of five 1s in byte 164 of mask 220, as shown in FIG. 6B. Accordingly, by making use of mask 220 assigned to brox 180, 190, or 200, a determination may be made as to which link a particular station address is located.

By making use of the 0s in mask 220 of FIG. 6B, an identification may be made of the host address 224 as shown in FIG. 6B. The host address, as shown in FIG. 6B, will comprise the last three bits of byte 154 and all eight bits of byte 156. Accordingly, byte 156 of address 210 will uniquely identify any of the stations connected to link 172. Alternatively, address 212, at byte 156, will identify any station connected to link 174, through a masking of the 0s of the mask 220 of FIG. 6b. Additionally, the end stations of link 176 and link 178 may likewise be identified by the 0s of mask 220 taken with the address 214 for link 176, and address 216 taken for link 178.

Since the host address of brox mask 220 of FIG. 6B uses eleven (11) bits, each link may have as many as $2^{**}11$ or two thousand forty eight (2,048) unique station addresses.

Referring now to FIG. 7A and FIG. 7B there is shown in FIG. 7B an end station mask 221. End station mask 221 has byte B1 160 contain: eight 1s, byte B2 162 also contains eight 1s. However, bytes B3 164 and byte B4 166 contain all zeros. Accordingly, an end station using mask 221, when applied to any address shown as address 210, 212, 214, 216 will determine that the subnet address is given by bytes 150 and byte 152. Bytes 150 and 152 were chosen to be the same for all stations in communications system 170. Accordingly, by use of mask 221, all end stations of communications systems 170 will determine the same subnet address 222. A consequence of all end stations on communications system 170 determining the same subnet address through use of end station mask 221 is that, in accordance with the ordinary rules of operation for a TCP-IP communications type system, the end stations will have permission to transmit a local ARP request message.

Figure 5:
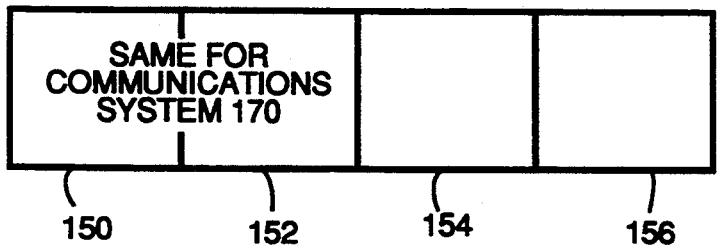
FIG. 5 is a field diagram of an address in accordance with the invention.

Turning now to FIG. 5, there is shown the full address for addresses 210, 212, 214 and 216. As shown in FIG. 5, bytes 150 and 152 contain the same value for each of addresses 210, 212, 214 and 216. The addresses 210, 212, 214, and 216 differ only in the different values contained in byte 154 and byte 156.

Operation of the Multiple Hop System

In the event that end station 172A desires to transmit a data message to end station 178C, the following events occur:

1. End station 172A does an AND operation between its address and the address of end station 178C. End station 172A uses the end station mask 221 of FIG. 7B. End station 172A then concludes that the subnet address 222 of itself and the subnet address 222 of end station 172A are equal, and so concludes that it may transmit a local ARP request message to end station 178C in order to learn the data link address of end station 178C.
2. Brox 180 parses the data link address of the local ARP request message, concludes that the local ARP request message is not addressed to brox 180, and accordingly receives the local ARP request message. Brox 180 recognizes the data packet as a local ARP request message, recognizes that the network layer address contained in the local ARP request message is the network layer address of end station 178C, and then creates a remote ARP request message and sends the remote ARP request message to brox 190. Brox 180 knows to send the remote ARP request message to brox 190 because brox 180 maintains a forwarding table showing the end stations attached to various broxs. This forwarding table is built up by inter-brox traffic, analogous to the inter-router traffic used by routers to build up forwarding tables.
3. Brox 190 receives the remote ARP request message, and transmits on connection 196 to link 178 a standard local ARP request message containing the data link address of end station 178C.
4. End station 178C responds to the local ARP request message by transmitting a local ARP response message containing the data link layer address of end station 178C onto link 178.
5. Brox 190 receives the local ARP response message from end station 178C, and brox 190 creates a remote ARP response message, and sends it to brox 180.
6. Brox 180 then creates a standard local ARP response message and transmits it through connection 182 to link 172, with the data link layer address of end station 172A in the Data Link Destination Address field 126 of the local ARP response message.
7. End station 172A then interprets the local ARP response message and extracts from it the data link layer address of end station 178C.
8. End station 172A then transmits a message packet directed to end station 178C, where the message packet contains the data link layer address of end station 178C in the Data Link Destination Address field 126.
9. Brox 180 parses the data link header 122 of the message packet, discovers the Data Link Destination address field 126 does not contain the address of connection 182, and therefore forwards the message packet as a bridge.
10. The message packet is forwarded through connection 184 to link 174 where brox 190 detects the message packet at connection 192.
11. Brox 190 parses the data link header 122 of the message packet, concludes that the data link destination address field 126 does not contain the data link address of connection 192, and accordingly forwards the message packet as a bridge. Brox 190 bridges the message packet through connection 196 onto link 178 on the basis of a forwarding table maintained within brox 190.
12. The message packet is detected by end station 178C detecting its own data link address in the Data Link Destination Address field 126 of the message packet. Accordingly, the intended receiving station 178C receives the message packet.

Each station in communication system 170 as shown in FIG. 4 uses end station mask 221 as shown in FIG. 7B, that is: on link 172 end stations 172A, 172B, 172C; on link 174 end stations 174A, 174B, 174C 174D; on link 176 end stations 176A, 176B, 176C; and on link 178 end stations 178A, 178B, 178C. The short mask 221 of FIG. 7B, when used by the end stations of communication system 170, causes all of the end stations of communication system 170 to conclude that they are on the same link. By coming to this conclusion, the end stations are permitted to transmit a local ARP request message for the data link address of an intended receiving station.

Each of the broxs, 180, 200, 190 use the longer brox mask 220, as shown in FIG. 6b. This longer brox mask 220 has 1s in the first five (5) positions of byte 164, and these 1s permit the broxs to distinguish the subnet addresses of links 172, 174, 176, 178, and thereby make the determination of whether to send local or remote ARP messages.

In the event that an end station on communication system 170 prepares to transmit a message packet to an end station connected to communication system 170 through brox 200 by wide area network communication link 204, then the address in bytes 150 and 152 of the proposed Network Layer Destination Address field 140 of the message packet will differ from bytes 150, 152 of an address of links 172, 174, 176, 178. Accordingly, a brox receiving a local ARP request message for such a distant end station will forward, in performing as a router, and forward the message packet to brox 200 which then sends it on the wide area network link 204 to an appropriate brox having a link to the intended receiving end station.

As can be seen from FIG. 6B and FIG. 7B, a brox sees a longer subnet address then does an end station. As shown at byte 164 in FIG. 6B, the subnet address seen by a brox is 5 bits longer than a subnet address seen by an end station using mask 221 from FIG. 7B. The shorter end station mask causes end station to see all of the end stations on communications network 170 as being on the same link. The longer brox mask 220, as shown in FIG. 6B, permits a brox to distinguish the intended receiving end station and also the link to which the intended receiving end station is attached to, and thereby make the determination of whether to send local or remote ARP messages.

Further, the assignment of the addresses of the end station is carefully done in order for the end stations to be distinguishable in accordance with the above discussion of the brox mask and the end station mask as shown in FIG. 6B and FIG. 7B. That is, each end station on communications system 170 was assigned a value of byte 154 as follows: link 172 was assigned a value of byte 154 of 11111000; link 174 was assigned a value of byte 154 of 11110000; link 176 was assigned a value of byte 154 of 11100000; link 178 was assigned a value of byte 154 of 11000000. This careful selection of addresses is the key to distinguishing end stations on different links by use of a short end station mask 221 and long brox mask 220.

FOURTH EXEMPLARY EMBODIMENT

Figure 8:
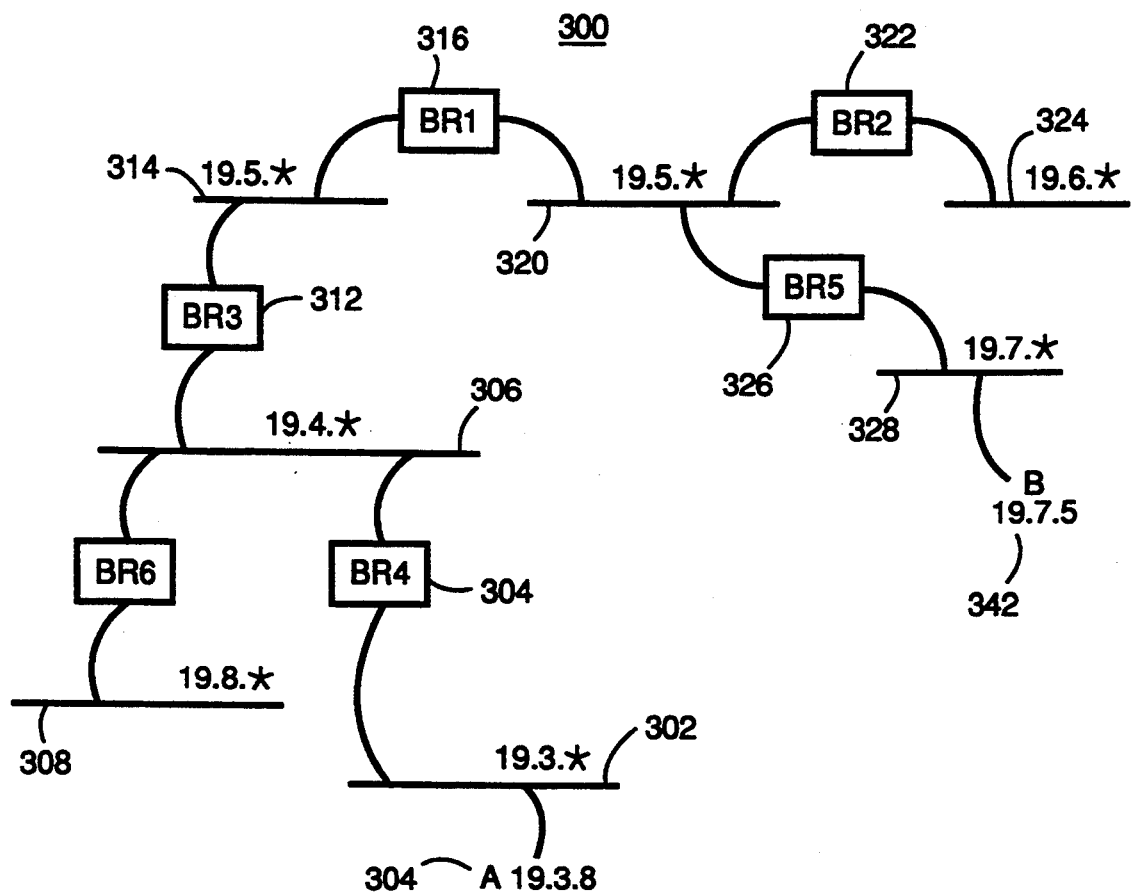
FIG. 8 is a block diagram of a communications system in accordance with the invention.

Referring now to FIG. 8, communications system 300 is shown. Network layer addresses for the end stations of communications system 300 will now be discussed. The network layer addresses are used in the Network Layer Destination Address field 140 of FIG. 2. The network layer address may, for example, have 4 bytes, 150, 152, 154, 156 as set out in FIG. 3A. The value of byte 150 may be represented by the numeral N1. The value of byte 152 may be represented as numeral N2. The value of byte 154 may be represented as numeral N3. The value of byte of 156 may be represented as numeral N4. The four byte address may then be represented as follows:

N1.N2.N3.N4

In the above symbolic representation of the network layer address, the numbers N1, N2, N3, N4, refer to the bytes of address 140, that is bytes 150, 152, 154, 156, respectively.

Careful selection of the values of the bytes N1, N2, N3, N4 permit the invention to utilize a short end station mask for an end station to gain permission to send a local ARP request, and a long brox mask to enable a brox to distinguish end stations on different links.

As a further example of representation of a network layer address, a mask may be, for example 12 bits long, that is the mask boundaries may not coincide with octet boundaries. For example, the mask shown in FIG. 6B uses 5 bits from octet 164. Still, a symbolic representation of the network layer address may be given as:

A1.A2.A3 where A1, A2, and A3 are numbers used to refer to parts of the network layer address. For example, A1 may represent a group of related LANs, A2 may represent a particular LAN of the group, and A3 may represent the host address.

An exemplary assignment of end station address follows.

Referring now to communications system 300 as shown in FIG. 8, LAN 302 is connected by brox BR4 304 to LAN 306. LAN 308 is connected brox BR6 310 to LAN 306. LAN 306 is connected by brox BR3 312 to LAN 314. LAN 314 is connected by brox BR1 316 to LAN 320. LAN 320 is connected by brox 322 to LAN 324. LAN 320 is connected by brox BR5 326 to LAN 328.

Each LAN, 302, 306, 308, 314, 320, 324, 328 has connected in communications connection, a plurality of end stations. For simplicity, only particular end stations will be directly discussed. LAN 302 is shown with end station A 340. LAN 328 is shown with end station B 342.

Addresses are assigned to the end stations on each LAN in accordance with the present invention. For example, addresses may be assigned to the LANs as follows. Each LAN is assigned an address 140 comprising 4 bytes, bytes 150, 152, 154, 156. As a simplification, only three of the bytes will be discussed herein, bytes 152, 154, 156. The highest byte 150 may be assigned an arbitrary number, however each link has the same value of byte 150. For example, in communication system 300 byte 152 is assigned the value "19". Accordingly, all stations on LAN 302 are assigned the address 19.3.*. The "*" means any unique number to distinguish the stations. All stations connected to LAN 306 are assigned the address 19.4.*. All stations connected to LAN 308 are assigned the address 19.8.*. All stations connected to LAN 314 are assigned the address 19.5.*. All stations attached to LAN 320 are assigned the address 19.5.*. All stations connected to LAN 324 are assigned the address 19.6.*. All stations attached to LAN 328 are assigned the address 19.7.*. The stations on each link include the plurality of end stations, as well as the connections to the respective broxs.

We now consider the event wherein end station A 340 on LAN 302, having a network layer address of 19.3.8 decides to send a message packet to end station B on LAN 328, having a network layer address of 19.7.5. The following events occur:

1. End station A 340 tests the network layer address of the intended receiving station B 342 in order to determine if end station 340 has permission to transmit a local ARP request message in order to learn the data link layer address of end station B 342. Addresses other than a TCP-IP 32 bit address may be used with the invention. For example, in the event that a three octet address is used, the end station A 340 may use a mask having the values:
11111111.00000000.00000000
and each brox in communication system 300 utilizes a mask having the values:
11111111.11111111.11111111
sin making forwarding decisions. Accordingly, end station A 340 utilizes its end station mask and concludes that the link where end station B 342 resides is "19.*.*", the same as the link where end station A 340 resides. Accordingly, end station A transmits a local ARP request message on LAN 302.

2. Brox BR4 304 detects the local ARP request message, interprets the local ARP request message, and creates a remote ARP request message directed to brox BR5 326. Brox BR4 304 knows to send the remote ARP request message to brox BR5 326 as a result of the broxs participating in a routing algorithms, as is well known in those skilled in the art of computer communications. Accordingly, brox BR4 304 transmits the remote ARP request message to brox BR5 326. Brox BR5 326 receives the remote ARP request message, and in response thereto transmits a standard local ARP request message onto LAN 328.

3. End station B 342 receives the local ARP request transmitted onto LAN 328, and generates a local ARP response message containing the data link address of end station B 342, where the data link address corresponds to the station having network layer address 19.7.5.

4. Brox BR5 326 detects the local ARP response message transmitted by end station B 342, recognizes it as a completion of a pending remote ARP request message, and creates a remote ARP response message. Brox BR5 326 then sends the remote ARP response message to brox BR4 304. Brox BR4 304 receives the remote ARP response message, and in response thereto creates a local ARP response message. Brox BR4 304 then transmits the local ARP response message onto LAN 302.

5. End station A 340 receives the local ARP response message from LAN 302, and interprets the local ARP response message, and stores the data link layer address of end station B 342.

6. End station A 340 then constructs a data packet containing the data link layer address of end station B 342 in Data Link Destination Address field 126 of a message packet 120.

7. Brox BR4 304 detects the data packet, parses the Data Link Header 122 and finds that the contents of the Data Link Destination Address field 126 are not an address used by brox BR4 304, and so concludes to forward the message packet as a bridge.

The data packet transmitted by end station A 340 is forwarded by all of the intermediate broxs behaving as bridges, brox BR4 304, brox BR3 312, brox BR1 316, and brox BR5 326. The data packet is thus forwarded at each hop, in some designs, in less than 1/200th of the time that would be required if a brox operated as a router.

The local ARP Request transmitted by end station A 340 onto LAN 302 is blocked by brox BR4 304. That is, the local ARP Request is not forwarded to LAN 306 as it would be if brox BR4 304 acted as a standard bridge. That is, brox BR4 304 acts as a standard router and isolates LAN 302 from LAN 306, in that it does not forward ARP messages between the LANs. Likewise, all local ARP requests and local ARP responses are isolated to the LAN on which they were created by the broxs functioning as routers.

Accordingly, data traffic may be forwarded between any end station on any link in communications network 300 by each of the broxs forwarding rapidly as a bridge. Also, the local ARP traffic generated on each LAN is isolated from each of the other links by each brox functioning as a router.

The invention, in all embodiments, has the beneficial effect that it speeds forwarding of data packets and so improves throughput in the data communications system.

A further benefit of the invention is that, in the event that an intermediate forwarding station is an old style router that does not change into a bridge in accordance with the Rules of the invention hereinabove, the invention will work perfectly well with all of the intermediate broxs functioning in accordance with the invention. Any intermediate "old style" routers already installed in an old system will not interfere with the improvements gained from new broxs added to the system.

Accordingly, the invention greatly improves the speed at which a message is forwarded over multiple links of a complex communications system.

What is claimed is:

1. A communications system having a first communications link and a second communications link, a first end station coupled with said first link, a second end station coupled with said second link,
   a forwarding apparatus for forwarding a packet from said first link to said second link, said forwarding apparatus detecting a network layer header within said packet, said network layer header having a destination address, said destination address having a subnet field and a host field, said communications system comprising:
   a forwarding mask, within said forwarding apparatus, said forwarding mask having a forwarding mask length, said forwarding mask for distinguishing said destination address into a first subnet address part and into a first host address part, said first subnet address part having a length equal to the length of said subnet field;
   an end station mask, in said first end station, said end station mask having an end station mask length, for distinguishing said destination address into a second subnet address part and into a second host address part, said end station mask length less than said forwarding mask length to distinguish said second subnet address part as having a length less than the length of said subnet field;
   said first end station and said second end station using said end station mask, responsive to said second subnet address part as having a length less than the length of said subnet field, to identify all end stations on said first link and said second link as being on a single link, and said forwarding apparatus using said forwarding mask to distinguish which of said first link or said second link to forward said data packet onto.

2. The communication system as in claim 1 further comprising:
   means for said first end station to transmit a local Address Request Protocol (hereinafter ARP ) request message onto said first communications link, said local ARP request message requesting a data link address of a receiving end station, said receiving end station coupled with a third link;
   means, in response to said local ARP request message, for said forwarding apparatus to send a remote ARP request message to a second forwarding apparatus, said second forwarding apparatus connected to said second link and said third link;
   means for said forwarding apparatus to receive a remote ARP response message containing said data link address of said receiving end station from said second forwarding apparatus;
   means, responsive to said remote ARP request message, for said forwarding apparatus to send a local ARP response message to said first end station.

3. The communications system as in claim 1, said forwarding apparatus further comprising:
   means for operating as a bridge in response to a data link destination address in said data packet not equal to a data link address of said forwarding apparatus.

4. The apparatus in claim 3 wherein said means for operating as a bridge further comprises:
   means for reading a data link layer header of said packet; and
   means for forwarding said packet based on the contents of said data link layer header of said packet.

5. The communications system as in claim 1, said forwarding apparatus further comprising:
   means for operating as a router in response to a data link destination address in said data packet equal to a data link address of said forwarding apparatus.

6. The apparatus as in claim 5 wherein said means for operating as a router further comprises:

means for reading a data link layer header of said packet;

means for reading a network layer header of said packet; and means for forwarding said packet based on the contents of said data link layer header and said network layer header of said packet.

7. The communications system of claim 1 wherein said first communication link and said second communications link are local area networks (LANs).

8. A communications system having a forwarding apparatus, said forwarding apparatus coupled with a first link and a second link, for forwarding a packet from said first link to said second link, said forwarding apparatus detecting a network layer header on said packet, said network layer header having a destination address, said destination address having a subnet field and a host field, said communications system comprising:

said subnet field on said packet having a first sub-field and a second sub-field, said first sub-field equal for all end nodes on said first link and all nodes on said second link, a forwarding mask, within said forwarding apparatus, said forwarding mask having a forwarding mask length, for distinguishing said destination address into a first subnet address part and into a first host address part, said first subnet address part equal to said subnet field, and said first host part equal to said host field;

an end station mask, within a first end station coupled with said first link, said end station mask having an end station mask length, said end station mask for distinguishing said destination address into a second subnet address part and into a second host address part, said end station mask length less than said forwarding mask length, said second subnet address part equal to said first subfield of said subnet field;

said first end station using said end station mask to identify all end stations on said first link and said second link as being on a single link, and said forwarding apparatus using said forwarding mask to distinguish which of said first link or said second link a receiving end station addressed by said destination address is located on;

means, responsive to said greater length of said forwarding mask than said end station mask, for said first end station to transmit a local ARP request message onto said first link, said local ARP request message requesting a data link address of said receiving end station, said receiving end station connected to a third link that is not said first link or said second link;

means, responsive to said local ARP request message, for said forwarding apparatus to send a remote ARP request message to a second forwarding apparatus attached to said second link and said third link;

means, responsive to said remote ARP request message, for said second forwarding apparatus to send a second local ARP request message to said receiving end station;

means, responsive to said second local ARP request message, for said receiving end station to send a local ARP response message to said second forwarding apparatus, said second local ARP response message containing said data link address of said receiving end station;

means, responsive to said local ARP response message, for said second forwarding apparatus to send a remote ARP response message to said forwarding apparatus;

means, responsive to said remote ARP response message, for said forwarding apparatus to send a second local ARP response message to said first end station;

means, responsive to said second local ARP response message, for said first end station to receive a data link address of said receiving end station, and for said first end station to transmit a second packet containing said data link address of said receiving end station, and for said forwarding apparatus to operate as a bridge in response to said data link address of said receiving end station being contained in said second packet.

9. The communications system of claim 8 wherein said plurality of communications links are local area networks (LANs).

10. A communications system having a forwarding apparatus for forwarding a packet from a first link to a second link, said apparatus detecting a network layer header within said packet, said network layer header having a destination address, said communications system comprising:

a forwarding mask, within said forwarding apparatus, having a forwarding mask length, for distinguishing said destination address into a first subnet part and into a first host address part;

an end station mask, within an end station on said first link, having an end station mask length for distinguishing said destination address into a second subnet address part and into a second host address part;

said forwarding mask length greater than said end station mask length, said end station using said end station mask to identify all end stations on said first link and said second link as being on a single link such that said end station obtains the data link address of any one of said all end stations on said first link and said second link by transmitting a local ARP request packet onto said first link, and said apparatus using said forwarding mask to distinguish on which of said first link and said second link a second end station addressed by said network layer address is located on.

11. The communications system of claim 10 wherein said plurality of communications links are local area networks (LANs).

12. A forwarding apparatus for forwarding packets comprising:

a receiving means (1000) for receiving a packet from a first LAN;

a local ARP request detecting means (1020) for determining if said packet is a local ARP request packet;

a first determining means (1022), responsive to said packet being a local ARP request packet, for determining if said packet is requesting an address of an end station attached to said first LAN; and a requesting means (1026), responsive to said packet being a local ARP request packet requesting the address of an end station not attached to said first LAN, for selecting a second LAN, and for requesting a second forwarding apparatus, said second forwarding apparatus attached to said second LAN, to both transmit a second local ARP request onto said second LAN and to relay a resulting ARP response packet to said forwarding apparatus.

13. The forwarding apparatus as in claim 12, further comprising:
   a discarding means (1024) responsive to said first determining means determining said packet is a local ARP request packet requesting the address of an end station attached to said first LAN, for discarding said packet.

14. The forwarding apparatus as in claim 13, further comprising:
   second determining means (1040) for determining if said packet is a remote ARP request;
   caching means (1042) responsive to said packet being a remote ARP request, for keeping record of the packet in a cache of pending remote ARP requests; and
   local request generating means (1049) responsive to said packet being a remote ARP request, for generating a local ARP request packet on a requested LAN indicated in said packet.

15. The forwarding apparatus as in claim 14 further comprising:
   a local ARP response detecting means (1030) for determining if said packet is a local ARP response;
   a cache checking means (1034) for determining if said cache of pending remote ARP requests cache contains a pending remote ARP request; and
   a remote ARP response generating means (1038), responsive to said packet being a local ARP response and said cache of pending remote ARP requests containing a pending remote ARP request, for generating a remote ARP response packet.

16. The forwarding apparatus as in claim 15, further comprising: a remote ARP response detecting means (1050) for determining if said packet is a remote ARP response packet; and
   a local ARP response generating means (1052), responsive to said packet being a remote ARP response packet, for generating a local ARP response.

17. A communications system, comprising:
   a first LAN and a second LAN, each end station on said first LAN and said second LAN having an associated network address, each said associated network address having a host field and a subnet field, each subnet field having a first subfield, the value of said first subfield being equal for all end stations on said first LAN and said second LAN;
   a first end station coupled with said first LAN;
   a second end station coupled with said second LAN;
   a forwarding apparatus for forwarding a packet from said first LAN to said second LAN, said forwarding apparatus capable of detecting a network layer header on a data packet, said network layer header having a destination address;
   means, within said forwarding apparatus, for distinguishing said destination address into a first subnet address part and into a first host address part, said first subnet address part equal to the value of said subnet field of said destination address, said first host address part equal to the value of said host field of said destination address, said forwarding apparatus using said first subnet address part to determine which of said first LAN or said second LAN an end station addressed by said destination address is located;
   means, within said first end station and said second end station, for distinguishing said destination address into a second subnet address part and into a second host address part, said second subnet address part equal to said first subfield in said destination address, said first end station and said second end station using the value of said second subnet part to identify all end stations on said first LAN and said second LAN as being on a single LAN.

18. The communications system as in claim 17 further wherein
   said forwarding apparatus forwards a packet based on a data link layer header of said data packet in the event that a data link destination address in said data link layer header of said data packet is not a data link address of said apparatus.

19. The communications system as in claim 17 further wherein said
   forwarding apparatus forwards a packet based on a data link layer header and said network layer header of said packet in the event that a data link destination address in said data link header of said data packet is equal to a data link address of said forwarding apparatus.

20. A communications system comprising:
   a first LAN;
   a second LAN;
   a forwarding apparatus for forwarding a first packet from said first LAN to said second LAN, said packet transmitted by an first end station on said first LAN, and said first packet containing a network layer destination address field value equal to a network layer address of a second end station on said second LAN;
   first masking means within said forwarding apparatus for dividing said network layer destination address within said first packet into a first subnet part and a first host part, said first subnet part indicating that said packet is to be forwarded onto said second LAN; and
   second masking means within said first end station on said first LAN for dividing said network layer destination address into a second subnet part and a second host part, said second subnet part indicating that all end stations on said first LAN and said second LAN are on a single LAN, such that said first end station obtains the data link address of said second end station by transmitting a local ARP request packet onto said first LAN.

21. The communications system as in claim 20, wherein said forwarding apparatus forwards:
   a data packet based on a data link layer header of said data packet in the event that a data link destination address in said data link layer header of said data packet is not a data link address of said apparatus.

22. The communications system as in claim 20, wherein said forwarding apparatus forwards:
   a data packet based on a data link layer header and said network layer header of said packet in the event that a data link destination address in said data link header of said packet is equal to a data link address of said apparatus.

* * * * *